United States Patent [19]

Steffes

[11] Patent Number: 4,828,336
[45] Date of Patent: May 9, 1989

[54] SKID-CONTROLLED BRAKE SYSTEM

[75] Inventor: Helmut Steffes, Hattersheim, Fed. Rep. of Germany

[73] Assignee: Alfred Teves GmbH, Frankfurt am Main, Fed. Rep. of Germany

[21] Appl. No.: 92,496

[22] Filed: Sep. 3, 1987

[30] Foreign Application Priority Data

Sep. 4, 1986 [DE] Fed. Rep. of Germany ....... 3630052

[51] Int. Cl.⁴ ................................................ B60T 8/32
[52] U.S. Cl. .................................... 303/114; 303/110; 303/116; 303/119
[58] Field of Search ............... 303/114, 113, 119, 110, 303/6 A, 6 C, 116, 115; 188/181 A

[56] References Cited

U.S. PATENT DOCUMENTS

| 4,362,339 | 12/1982 | Belart | 303/113 |
| 4,492,413 | 1/1985 | Belart et al. | 303/114 |
| 4,729,611 | 3/1988 | Kircher et al. | 303/119 |

FOREIGN PATENT DOCUMENTS

| 3247496 | 6/1984 | Fed. Rep. of Germany. | |
| 3446063 | 6/1986 | Fed. Rep. of Germany. | |
| 3505410 | 8/1986 | Fed. Rep. of Germany | 303/116 |
| 2165905 | 4/1986 | United Kingdom | 303/119 |
| 2170286 | 7/1986 | United Kingdom. | |

Primary Examiner—Andres Kashnikow
Assistant Examiner—Mark T. Le
Attorney, Agent, or Firm—James B. Raden

[57] ABSTRACT

A skid-controlled brake system comprising a brake pressure generator connected to which, through pressure fluid conduits, are wheel brakes. The system further includes a hydraulic auxiliary pressure supply system having a hydraulic pump, a pressure compensating and pressure fluid reservoir, a hydraulic accumulator and a pressure limiting valve with wheel sensors and electronic circuits. A disconnecting valve is switched into the pressure fluid path leading from the pressure chamber to the connected wheel brakes. Moreover, one in-flow conduit which terminates in the pressure fluid path leading from the disconnecting valve to the wheel brake is provided. Into this conduit is switched an in-flow valve which, is in communication with the auxiliary pressure source through a supply line. A return conduit is connected to the wheel brakes. In this return line, an outlet valve is provided so that, for the pressure build-up in the wheel brakes, upon actuation of the master cylinder pressure fluid only flows through the disconnecting valves and, during control, only through the in-flow valves. A 3-way/2-position valve is provided in the in-flow conduit which connects the in-flow valves either to the accumulator or to the pressure fluid reservoir.

3 Claims, 1 Drawing Sheet

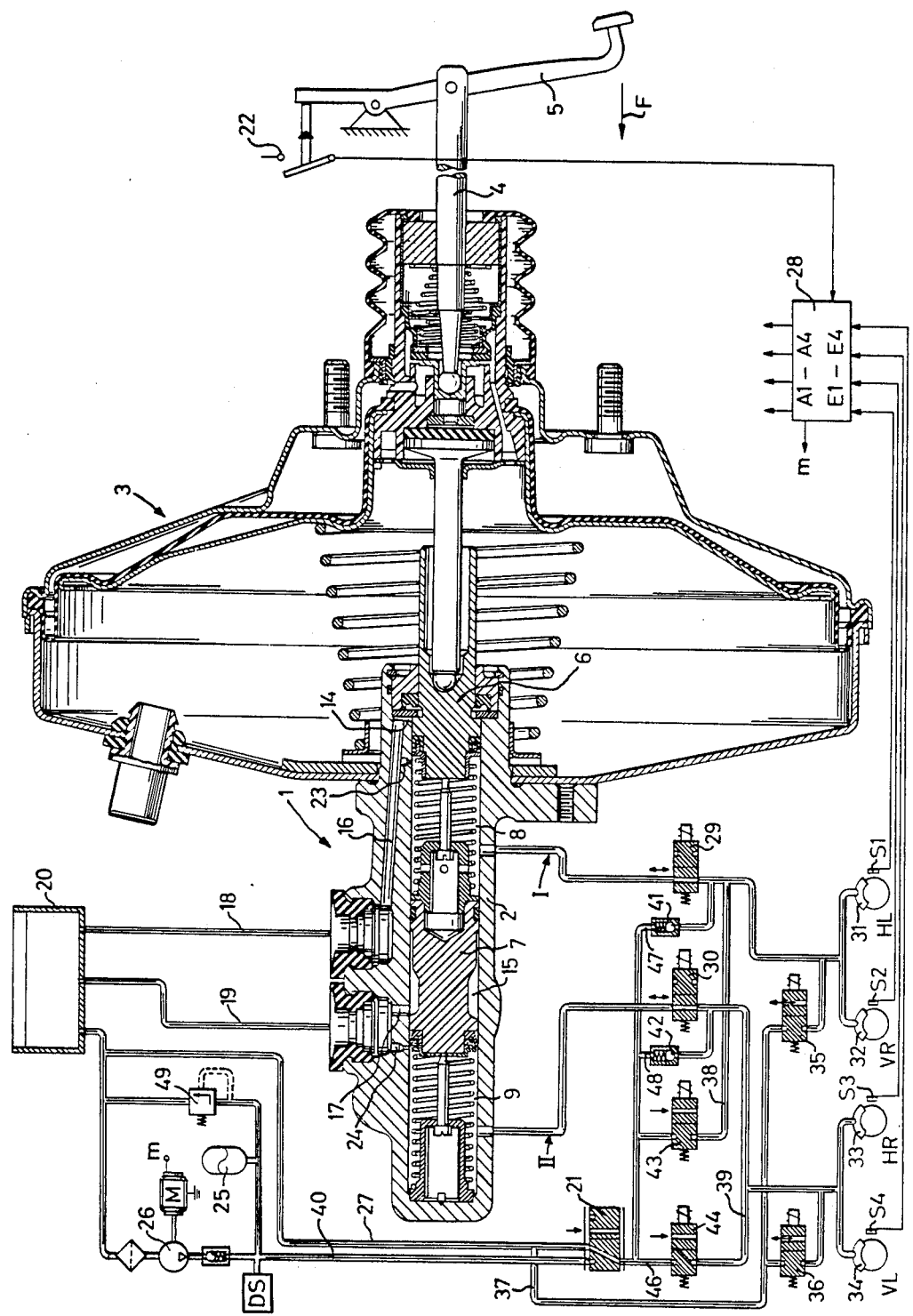

SKID-CONTROLLED BRAKE SYSTEM

BACKGROUND OF THE INVENTION

The present invention is concerned with a skid-controlled brake system comprising a pedal-operated, preferably auxiliary force-supported, brake pressure generator. The brake pressure generator is connected to the wheel brakes via pressure fluid conduits. The brake system further comprises a hydraulic auxiliary pressure supply system including a hydraulic pump. a pressure accumulator, a pressure compensating and pressure fluid reservoir and an auxiliary pressure control valve. Also, the system includes wheel sensors and electronic circuits for detecting the wheel rotating pattern and for generating electric brake pressure control signals capable of controlling electromagnetically operable pressure fluid inlet and outlet valves provided in the pressure fluid conduits for skid control purposes.

A brake system of the afore-described type is disclosed, for example, in U.S. Pat. Nos. 4,415,210 and 4,416,491, wherein the brake pressure generator is a master cylinder including a hydraulic brake force booster coupled ahead thereof. The auxiliary pressure supply system contains a hydraulic pump and a hydraulic accumulator from which an auxiliary pressure proportional to the pedal force is admitted through a control valve upon applying the brake. Dynamic pressure is transmitted through the master cylinder to the static brake circuits connected to the master cylinder. The wheel brakes of one axle, preferably of the rear axle, are directly connected to the pressure chamber to which the pressure proportional to the pedal force is admitted through the control valve. For skid-control purposes, inlet valves are provided both in the static circuits and in the dynamic circuit, which inlet valves, normally, are switched to the passage position and through which, in the event of imminent locking of one wheel, the pressure fluid supply can be discontinued to the concerned wheel brake. Outlet valves are provided through which, if necessary, pressure fluid can be discharged from the wheel brake to the pressure compensating reservoir. Upon commencement of skid control, the booster chamber is in communication with the static brake circuits of the master cylinder through a so-called master valve in order to enable the pressure fluid discharged through the outlet valves to be re-fed to the static circuits. The structural details required for generating, storing and controlling the hydraulic auxiliary pressure, for the dynamic in-flow into the static circuits and for insuring the brake functions upon failure of individual circuits, are rather substantial.

The control signals for the inlet and outlet valves, in brake systems of the afore-described type are generated with the aid of electronic circuits the inlets of which are in communication with wheel sensors, for example, inductive transducers. The electronic circuits are capable of responding to a change in the wheel rotating pattern indicative of theh locking risk by keeping constant, reducing and reincreasing the pressure on the concerned wheel.

SUMMARY OF THE INVENTION

It is an object of the present invention to so configure the brake system so that pressure fluid flows through a small number of valves while applying the brake and also during control of the brake pressure. Moreover, the brake system is in the form of an add-on system (i.e., mountable to and interconnectible with standard and commercially available brake systems). Finally, skid control is insured in case of a temporary failure of the hydraulic pump of the auxiliary pressure source.

In the practice of the invention, this is achieved by providing a disconnecting valve in the pressure fluid path between the pressure chamber and the wheel brakes in communication therewith. An in-flow line also is provided which terminates in the pressure fluid path between the disconnecting valve and the wheel brake. Inserted into the line is an in-flow valve which is in communication with the auxiliary pressure source through a supply line. A return conduit having an outlet valve is connected to the wheel brakes and a multi-way valve is provided in the supply line so that, for enabling pressure to build up in the wheel brakes upon actuation of the master cylinder, pressure fluid only flow through the disconnecting valves and, in the event of brake pressure control, only through the in-flow valves.

Preferably, the master valve switched into the in-flow line between the auxiliary pressure source and the in-flow valves, is a 3-way/2-position control valve drivable through hydraulic control lines to which the pressure in the pressure chambers of the master cylinder is applied. A pressure fluid connection between the in-flow valves and the pressure fluid reservoir is established through the master valve.

Feasibly, the line section of the in-flow line connecting the 3-way control valve to the in-flow valves, through branch lines, is connected to the brake circuits. Check valves are switched into the branch lines through which a pressure decrease from the wheel brakes can be effected via the 3-way control valve to the return conduit.

Advantageously, the master valve provided in the pressure fluid path between the auxiliary pressure source (preferably, the accumulator) and the in-flow valves is in the form of a 3-way/2-position valve. The third connection of this valve is in communication with the pressure fluid reservoir through a return conduit.

To insure that the accumulator pressure is kept within predetermined limits, a pressure limiting valve is coupled to the hydraulic accumulator in communication with the master valve.

An advantage of the brake system according to the present invention is that standard brake systems may be employed. A pump accumulator valve block unit may be mounted as a separate unit in addition to the standard brake systems (i.e., a booster and a master cylinder).

The brake system of this invention comprises an accumulator which is permanently monitored. To permit the use of a commercially available tandem master cylinder including breather bores (no central valves), the pressure from the wheel cylinders, is reduced through a 3-way/2-position control valve, in the direction of the pressure fluid reservoir after brake control.

BRIEF DESCRIPTION OF THE DRAWING

Further features, advantages and applications of this invention will become clear from the following description of one embodiment of the invention with reference to the enclosed drawing. The drawing shows, partly in section and partly schematically, the major units of a skid-controlled brake system according to one embodiment of this invention.

DETAILED DESCRIPTION OF THE INVENTION

In the embodiment as shown, the brake system of the invention comprises a brake pressure generator 1, including a hydraulically actuatable tandem master cylinder 2 and a vacuum booster 3 coupled thereto. The pedal force F exerted on a brake pedal 5 is transmitted through a push rod 4, in a known manner, to the vacuum booster 3 from where it is—supported by auxiliary pressure—transmitted to the working pistons 6 and 7 of the tandem master cylinder 2.

In the release position of the brake as shown, the pressure chambers 8, 9 of the master cylinder 2 are in communication with a pressure compensating and pressure fluid supply reservoir 20 through open breather bores 23, 24 and hydraulic conduits 18, 19. Moreover, bores 16, 17 are provided which communicate with annular chambers 14 and 15, respectively.

The two brake circuits I, II of the master cylinder 2 are connected, respectively, to two sets of wheel brakes 31, 32; 33, 34 through electromagnetically operable valves 29, 30. In the basic position these valves are switched to passage (i.e., the valves which can be referred to as disconnecting or inlet valves or SO-valves are open in their de-energized position). Wheel brakes 31, 32 and 33, 34, respectively, are connected in parallel and can be associated, for example, with the wheels of one axle (i.e., rear wheels HR, HL; front wheels VR, VL) or, as shown in the present drawing, to diagonally opposite wheels on different axles (i.e., HL, VR; HR, VL).

The wheel brakes are in communication with electromagnetically operable SG-valves or outlet valves 35, 36 which are closed in the basic or de-energized position and in communication through a hydraulic return line 37 with the pressure compensating reservoir 20.

The brake circuitis I, II, are connected to the auxiliary pressure supply system and the hydraulic pump 26 and to the hydro-accumulator 25 and the auxiliary pressure control valve 49 through an SG- or outlet valve 35, 36 or an in-flow valve 43, 44 and through a connecting line 40. Once the auxiliary pressure increases by a predetermined minimum amount beyond the momentary pressure prevailing in brake circuits I, II, the master valve or the 3-way control valve 21 opens the passage from the supply line 40 to the in-flow valves 43, 44 and, hence, to the wheel brakes 31 to 34.

The vehicle wheels are equipped with inductive sensors $S_1$ to $S_4$ in cooperation with a crown wheel engaged in synchronism with the wheel rotation and generating electric signals detecting the wheel rotating pattern (i.e., the rotational velocity and velocity changes). These signals, through inlets $s_1$ to $s_4$, are supplied to an electronic signal processing and combining circuit 28 generating brake pressure control signals with the aid of which the in-flow valves 43, 44; the disconnecting valves 29, 30 and the outlet valves 35, 36, are temporarily re-switched once a wheel locking tendency has been detected whereby the brake pressure is kept constant, decreased and re-raised as necessary over a period of time. For this purpose, through outlets $a_1$ to $a_4$, the actuating magnets of the inlet and outlet valves are driven. For the sake of simplicity, the electric connecting conduits between connections $a_1$ and $a_4$ and the windings of valves 29, 30, 35, 36, 43, 44 have not been illustrated.

The signal processing and combining circuit 28 can be constructed in a known manner with hardware-implemented circuits or programmable electronic modules, such as micro-computers or micro-controllers.

The intake side of pump 26 is in communication with reservoir 20. The pump is a hydraulic pump actuated by electromotive force (motor M). The electric connections "m" and "ground", equally, are symbolized.

The switch-on signal for starting the driving motor of the hydraulic pump 26 in operation during a skid control operation, through connection m, is applied to motor M.

The operation of the brake system according to the present invention is as follows:

When applying the brake, pedal force F—supported by the vacuum in the booster 3—is transmitted to the master cylinder piston 6, 7. The breather bores 23, 24 thereby close enabling brake pressure to develop in the pressure chambers 8, 9 and, hence, in brake circuits I, II. This brake pressure, passes to the wheel brakes 31, 32 and 33, 34, through valves 29, 30, respectively.

If a locking tendency is detected on one or more of the wheels with the aid of the sensors $S_1$ to $S_4$ and switch circuit 28, skid control will commence. Driving motor M of pump 26 will be switched on, with a predetermined auxiliary pressure being constantly applied through the auxiliary supply system to the supply line 40 since a pressure switch DS is mounted to the hydro-accumulator 25 which causes the accumulator to be reloaded by the pump 26 to a predetermined pressure level once the pressure monitoring means (not shown) indicates a pressure decrease.

An electric signal from the circuit 28 results in re-switching of the electromagnetically operable valves 29, 30 and, hence, in a blocking of the brake circuit is I, II. The auxiliary pressure supply system, through the supply line 40 and the opening of the 3-way control valve 21 will assume the function of the brake pressure generator 1. Through valve 21, supply line 46 and the in-flow valves 43, 44, pressure fluid dynamically flows into the brake circuits I, II. However, the actual brake pressure pattern in the wheel brakes 31 to 34 is established by operation of the inlet and outlet valves 43, 44, 35, 36 to which skid-controlling brake pressure control signals are supplied through lines $a_1$ to $a_4$.

In this system, pressure is always available in the accumulator 25 which is applied to the 3-way control valve 21 and to the first SG-valves 43, 44, respectively, and the SO valves 29, 30 will close upon commencement of the brake control. They will remain closed until a stoplight switch 22 is actuated. Depending on the degree of skidding of wheels 31 to 34, volume is discharged by the second SG-valves 35, 36 from circuits I, II into the reservoir 20 through the return line 37, or is supplied by the first SG-valves 43, 44. The dynamically controlled pressure is insignificantly higher than the static pressure. After completion of the brake control, the system remains dynamic. The SO-valves 29, 30 will remain blocked and the first SG-valves 43, 44 are opened. The pressure decreases from the circuits I, II is exclusively effected through the 3-way control valve 21. It is only after stoplight switch 22 is no longer actuated by pedal 5 that SO-valves 29, 30 open and the non-pressurized volume of the master cylinder 2, through the breather bores 23, 24, is discharged into the reservoir 20.

As disclosed by the drawing, the inlet or disconnecting valves 29, 30 are additionally locked by check valves 41, 42 connected in parallel. Check valves 41, 42 of the afore-mentioned type, in special cases, permit a termination of the brake pressure control and a release of the wheel brakes since, with the disconnecting valves 29, 30 still closed, a small amount of pressure fluid can flow back from the wheel brakes into the return line 27 once the 3-way valve is switched into the position as shown in the drawing.

What is claimed is:

1. A skid-controlled brake system for an automotive vehicle having vehicle wheels and wheel brakes, said system comprising, in combination:
   a pedal-operated brake pressure generator connected to the wheel brakes through pressure fluid conduits and including a master cylinder having at least one pressure chamber therein;
   a vacuum booster preceding said pressure generator;
   an auxiliary pressure supply system including a hydraulic pump, an input and a pressure supply output;
   a pressure fluid reservoir connected to said input of said auxiliary pressure supply;
   a plurality of wheel sensors coupled to the vehicle wheels for providing sensor signals indicative of wheel rotational behavior;
   an electronic circuit receptive of said sensor signals for providing output signals in response thereto;
   a plurality of electromagnetically operated valves provided in said pressure fluid conduits for wheel skid control in response to said output signals;
   wherein said electromagnetically operated valves include at least one disconnecting valve connected in a pressure fluid path between said pressure chamber and the wheel brakes;
   a master valve connected to said wheel brakes and alternately connected to one of said pressure supply output or said pressure fluid reservoir;
   wherein said electromagnetically operated valves include at least one inlet valve connected between said pressure master valve and said wheel brakes;
   a return line connected between said wheel brakes and said pressure fluid reservoir;
   wherein said electromagnetically operated valves include at least one outlet valve connected in said return line between said wheel brakes and said pressure fluid reservoir; and
   wherein during pedal operation of said pressure generator, pressure fluid flows from said pressure chamber through said at least one disconnecting valve and directly to said wheel brakes without passing through said inlet valve and wherein during slip control, fluid flows to and out from said wheel brakes solely through said inlet valve and said master valve.

2. The system according to claim 1, wherein said master valve comprises a 3-way/2-position control valve.

3. The system according to claim 2 wherein said master cylinder includes first and second pressure chambers and wherein each chamber is separately respectively connected to said wheel brakes by way of first and second pressure fluid conduits respectively including first and second ones of said disconnecting inlet and outlet valves.

* * * * *